Oct. 8, 1935.  W. E. SLOAN  2,016,397
FLUSH VALVE
Filed Aug. 11, 1930
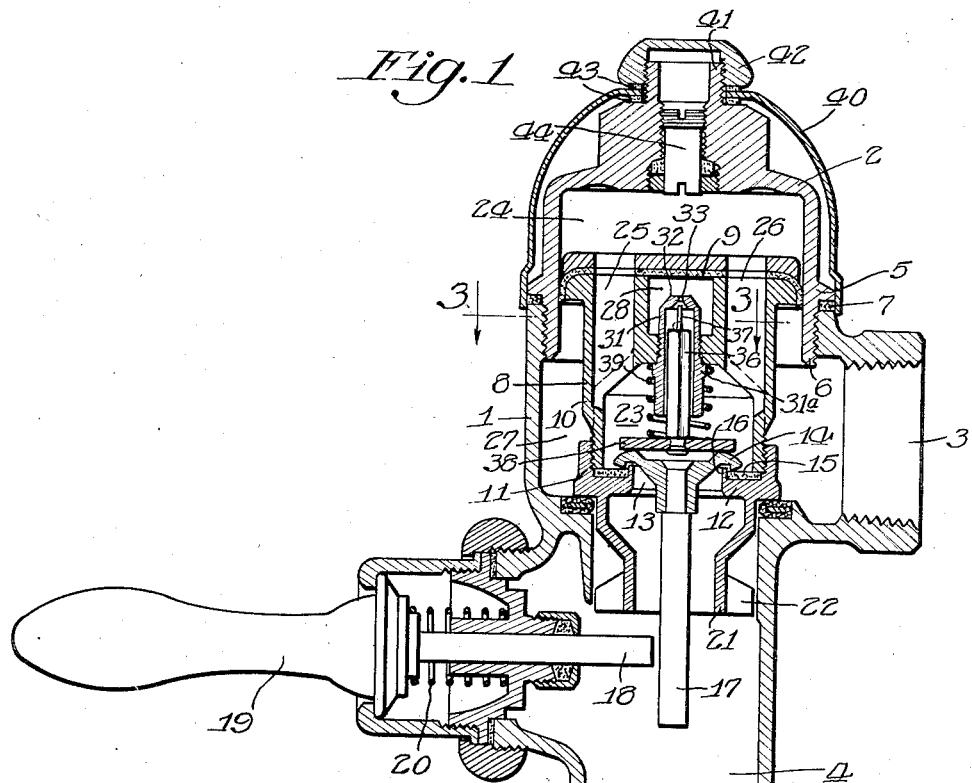
Inventor
William E. Sloan
By Parker & Carter Attys.

Patented Oct. 8, 1935

2,016,397

UNITED STATES PATENT OFFICE 2,016,397

FLUSH VALVE

William E. Sloan, Chicago, Ill.

Application August 11, 1930, Serial No. 474,368

2 Claims. (Cl. 137—93)

This invention relates to flush valves and has for its object to provide a new and improved device of this description. In flush valves of this type the main valve, by means of which the passageway is opened for the flow of water to form the flush, there is a bypass which is comparatively small, or which has a comparatively small section, and through which the water passes from the supply side of the valve to the chamber above the valve. This bypass, due to the fact that it must be small to permit only a small flow of water to prevent the valve from closing too quickly, is constantly in danger of being stopped up by particles of dirt, sand or other foreign matter in the water.

The present invention has as one of its objects to provide means whereby the danger of the bypass being closed or obstructed is completely eliminated.

The invention has as a further object to provide a separate cover for the upper section of the valve casing. The invention has further objects which are more particularly pointed out in the accompanying description.

Referring now to the drawing, Fig. 1 is a vertical sectional view through one form of flush valve embodying the invention;

Fig. 2 is an enlarged view of the narrow portion of the bypass and associated parts;

Fig. 3 is an enlarged sectional view taken on the line 3—3 of Fig. 1.

Like numerals refer to like parts throughout the several figures.

Referring now to the drawing, there is illustrated a flush valve consisting of a casing made up of the sections 1 and 2. This casing is provided with an inlet 3 by means of which it is connected with the source of water supply. There is an outlet 4 by means of which it is connected to the device into which the water is to be discharged. The section 2 of the casing is provided with an annular projection 5 and a downwardly projecting screwthreaded part 6 which has a threaded engagement with the interior of the section 1 of the casing. A gasket 7 is interposed between the annular projection 5 and the top of the section 1 so that a tight joint is insured. Within the casing is a main valve 8 which has the packing member 9 engaging the inner face of the casing. This main valve is hollow and is made up of two sections 10 and 11. The lower end of the section 10 is screwthreaded and projects into the lower section and has a threaded connection therewith. The lower section 11 has an inwardly projecting ledge 12 which surrounds an opening 13 controlled by the auxiliary valve 14. The ledge 12 has a packing 15 which is held in place by the lower end of the section 10. This ledge 12 has an upstanding portion 16 which preferably projects above the packing and fits into a recess in the auxiliary valve 14 when the valve is shown as a tilting valve, and has a valve stem 17, the valve being opened by moving the lower end of the valve stem laterally by means of an actuating member 18 which is pushed inwardly by a handle 19 and which is retracted by a spring 20. The actuating member 18 is pushed inwardly when the handle 19 is moved in any direction. The lower section 11, which is hollow, has its lower end 21 contracted and on the outer portion of this contracted end are a series of projections 22. The hollow portion 23 of the main valve, which communicates with the outlet 4 when the auxiliary valve is opened, is connected to the upper chamber 24 by means of the passageways 25 and 26. These passageways and the hollow portion 23 are connected with the lower water chamber 27 by a bypass, which in the construction shown consists of the enlarged section 28 which is connected by the ports 29 and 30 (Fig. 3) with the chamber 27. This chamber 27 is connected with the source of supply and has the pressure of the source of supply when the main valve is closed. Projecting into the enlarged section 28 of the bypass is a tube 31 which is closed at its upper end by the member 32, except for the small opening 33 in said chamber. The tube 31 has a screwthreaded engagement with the main valve and its lower end projects into the hollow portion 23. This tube is provided with a stop 31a which prevents it from being pushed up too far into the enlarged portion 28 of the bypass opening.

The small opening 33 communicates with an enlarged opening 34 having inclined walls, as is clearly shown in Fig. 2. The central opening 35 of the tube 31 is preferably circular. Within this tube is a control member 36 which has at its upper end a pin 37. This pin is normally withdrawn from the opening 33 so that said opening is fully opened when the main valve is seated, as clearly shown in Fig. 2. The control member 36 is preferably non-circular so as to provide plenty of space between its sides and the inner wall of the tube 31 for the bypass water to pass without danger of being clogged up by foreign matter. The lower end of the control member is connected with a laterally extending piece 38 which rests on the top of the auxiliary valve 14. The retracting spring 39 is interposed between the member 38 and a fixed part on the valve and acts to move the auxiliary valve to its seat when the handle 19 is released.

The valve is provided with a separate cover 40 for the upper section of the valve casing. The lower end of this cover preferably projects just beyond the packing 7. The upper end of this cover is provided with an opening through which the threaded end 41 of the casing projects. The nut 42 is screwed on to this threaded end and clamps the cover 40 in position. The packing 43 is provided between the cover and the nut and the casing so as to prevent any leakage. The upper section of the cover is provided with a hole extending therethrough into which fits a pin 44 which projects into the chamber 24 and which can be adjusted to vary this projection to control the upward movement of the main valve.

By means of this construction the exterior of the upper section 2 of the casing need not be finished, but can be left in the rough and the cover 40 will completely cover and conceal it, thereby permitting a reduction in the cost of manufacture. At the same time the cover 40 adds to the appearance of the valve.

The use and operation of my invention are as follows:

When the parts are in the position shown in Fig. 1, the main valve and the auxiliary valve are both closed and the narrow section 33 of the bypass is fully and completely opened. When it is desired to operate the valve, the handle 19 is moved in any direction and this causes the part 18 to move inwardly and engage the stem 17 of the auxiliary valve 14 and tilt this auxiliary valve to open it. The water in the chamber 24 above the main valve then rushes out through the openings 26, hollow portion 23 and the opening 13 and through the discharge 4. This relieves the pressure above the piston, and the pressure of the water in the chamber 27 moves the piston up. When the auxiliary valve is tilted, as above set out, its engagement with the part 38 moves said part upwardly, and also moves upwardly the control member 36 connected therewith. This causes the pin 37 to move up into the opening 33, that is the narrow portion of the bypass and clean it, forcing out of it any foreign matter that may be lodged therein. When the handle 19 is released, the auxiliary valve is returned to its closed position and the pin 37 is removed from the opening 33. Water then passes from the chamber 27 through the ports 29 and 30 into the enlarged section 28 of the bypass and thence through the opening 33 into the tube 31, and thence down along along the sides of the control member 36 into the hollow portion 23, and then up through the passageways 25 and 26 into the upper chamber 24. The main valve is then gradually moved to its seat as the pressure in the chambers 24 and 27 equalize. It will be seen that by means of this construction a bypass having a small cross sectional area is provided, and yet the stopping up of this small cross sectional portion is absolutely prevented by the pin 37 which is forced therethrough every time the valve is operated. It will further be seen that when the bypass is in actual use, this portion thereof of small cross sectional area is fully opened and has no obstructing member of any kind therein. This is of vital importance in valves of this kind and insures the proper operation of the bypass under all conditions.

I claim:

1. A flush valve comprising a casing, a main valve mounted therein dividing the casing into two chambers, an upper chamber and a lower chamber, said main valve having a hollow portion, an auxiliary valve in said hollow portion, a by-pass connecting the upper and lower chambers, a tube forming a part of said by-pass having a closing member at one end provided with a small opening, a pin normally withdrawn from said opening when the main valve is closed but adapted to be moved therein, a reciprocating actuating part connected with said pin and reciprocating in said tube, a laterally extending member connected with said part and engaging said auxiliary valve, and means for moving said auxiliary valve so as to move said pin into said small opening.

2. A flush valve comprising a casing, a main valve mounted therein dividing the casing into two chambers, an upper chamber and a lower chamber, said main valve having a hollow portion, an auxiliary valve in said hollow portion, a by-pass connecting the upper and lower chambers, a tube forming a part of said by-pass having a closing member at one end provided with a small opening, a pin normally withdrawn from said opening but adapted to be moved therein, a reciprocating actuating part non-circular in cross section connected with said pin and reciprocating in said tube, a laterally extending member connected with said part and engaging said auxiliary valve, and means for moving said auxiliary valve so as to move said pin into said small opening.

WILLIAM E. SLOAN.